United States Patent [19]

Smith et al.

[11] Patent Number: 4,656,708
[45] Date of Patent: Apr. 14, 1987

[54] LIVE TOOLING TURRET

[75] Inventors: Roger R. Smith, Erin; K. Kamalakar Rao, Elmira Heights, both of N.Y.

[73] Assignee: Hardinge Brothers, Inc., Elmira, N.Y.

[21] Appl. No.: 792,462

[22] Filed: Oct. 29, 1985

[51] Int. Cl.$^4$ ............................................. B23B 39/20
[52] U.S. Cl. .......................................... 29/40; 29/39; 409/230
[58] Field of Search ............... 29/39, 40, 568; 408/35; 409/230

[56] References Cited

U.S. PATENT DOCUMENTS

| 3,830,584 | 8/1974 | Ohlig et al. | 29/40 X |
| 4,429,443 | 2/1984 | Kölblin et al. | 29/26 A |
| 4,563,925 | 1/1986 | Link | 29/568 X |

FOREIGN PATENT DOCUMENTS 2157211 10/1985 United Kingdom ............... 409/230

Primary Examiner—Gil Weidenfeld
Assistant Examiner—Steven C. Bishop
Attorney, Agent, or Firm—Shlesinger, Arkwright, Garvey & Fado

[57] ABSTRACT

A live tooling turret assembly comprising a stationary housing, a turret top plate movably mounted on the housing for axial and rotational displacement with respect to the housing, the turret top plate including a drive shaft extending into the housing and through the top plate, the turret top plate including means for mounting live tooling, the drive shaft including means for engaging and driving the live tooling when mounted on the top plate, supporting means in the housing supporting the top plate including the drive shaft, the supporting means being movably mounted in the housing for axial and rotational displacement simultaneously with the top plate, indexing means associated with the housing for moving the top plate and the supporting means axially and rotationally with respect to the housing, and drive means associated with the drive shaft for permitting the drive shaft to be driven independently of the indexing means and for permitting the drive shaft to be driven simultaneously with the indexing means when the indexing means is moved axially and rotationally with respect to the housing.

23 Claims, 3 Drawing Figures

LIVE TOOLING TURRET

FIELD OF THE INVENTION

This invention relates to an indexable turret assembly for a machine tool and more particularly to an indexable turret assembly for a machine tool having provisions for mounting stationary as well as live tooling including means for driving the live tooling.

BACKGROUND OF THE INVENTION

Indexable turret assemblies have found wide-spread use in the machine tooling industry. Such assemblies are capable of selectively positioning a plurality of diverse tools into proper alignment with a workpiece so as to allow sequential machining operations to be performed thereon.

The most common types of indexable turret assemblies are those which support tools suitable for turning operations wherein the tools are stationary with respect to a revolving workpiece or those which support tools suitable for milling, drilling, tapping, etc. wherein the tools are rotatably driven with respect to a non-rotating workpiece.

There have more recently been developed machine tools having indexable turret assemblies capable of supporting combinations of live as well as stationary tools. Such turret assemblies serve to increase the overall flexibility of the machine tool by allowing greater diversity in the machining operations.

One such machine tool is disclosed by Kolblin in U.S. Pat. No. 4,429,443. Kolblin teaches the use of an indexable turret assembly for supporting stationary as well as live tooling including a live tooling engagement device movable between a decoupled position and a coupled position by means of a piston in cylinder arrangement.

One shortcoming associated with the apparatus of Kolblin is that the live tooling drive units are separate from the indexing drive units thus adding to the overall complexity of the turret assembly.

SUMMARY AND OBJECTS OF THE INVENTION

The present invention provides a turret assembly including a rotatable indexable turret top plate having mounted thereon stationary as well as live tooling and wherein a single drive motor is utilized in order to perform indexing (angular rotation of the turret top plate) as well as to drive the live tooling mounted thereon. The turret assembly further includes encoder means activated during the indexing operation in order to allow precise tracking of the turret top plate during rotation thereof. The drive motor is variable speed and reversible in order to allow bi-directional indexing following the shortest path further allowing the live tooling to be bi-directionally driven at variable speeds.

It is therefore an object of the present invention to provide an indexable turret assembly capable of supporting stationary as well as live tooling.

Another object of the present invention is to provide a turret assembly having an indexable turret top plate capable of supporting live tooling including a single drive unit responsible for driving the live tooling as well as for causing angular displacement of the turret top plate during indexing.

Still a further object of the present invention is to provide an indexable turret assembly including a variable speed reversible motor drive unit allowing bi-directional indexing following the shortest path and further including reversible bidirectionally driven live tooling.

A further object of the present invention is to provide a turret assembly having an indexable turret top plate and encoder means for accurately tracking angular displacement of the turret top plate during indexing thereof.

The foregoing and other objects and advantages of this invention will appear from the following detailed description, taken in connection with the accompanying drawings, in which.

DETAILED DESCRIPTION OF THE DRAWINGS

Figure 1:
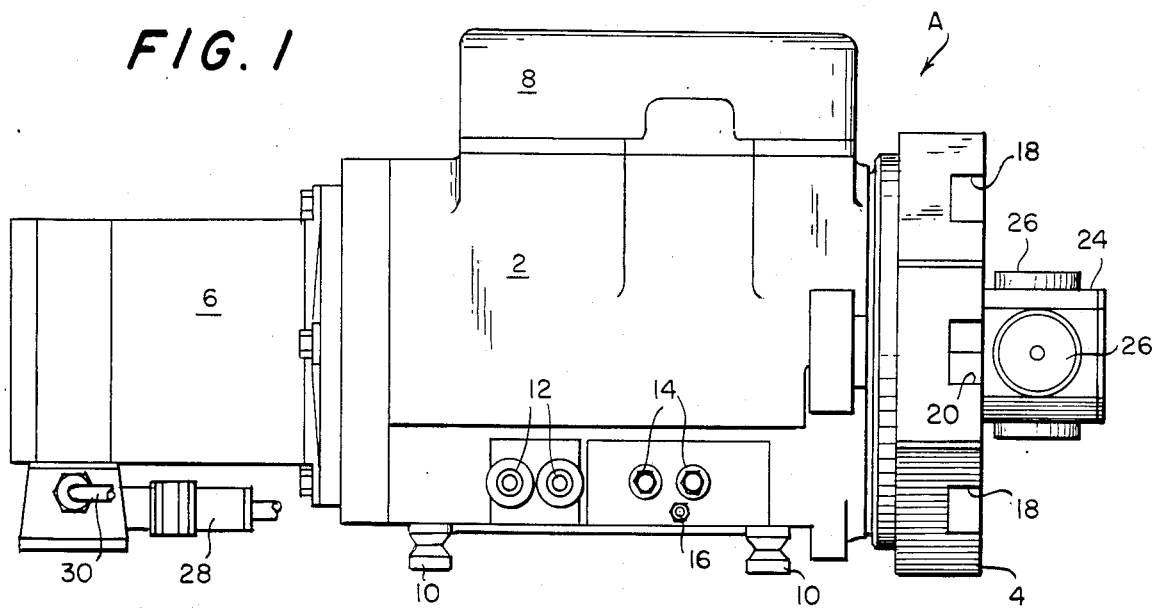
FIG. 1 is a side elevational view of the turret assembly of the present invention.
Figure 2:
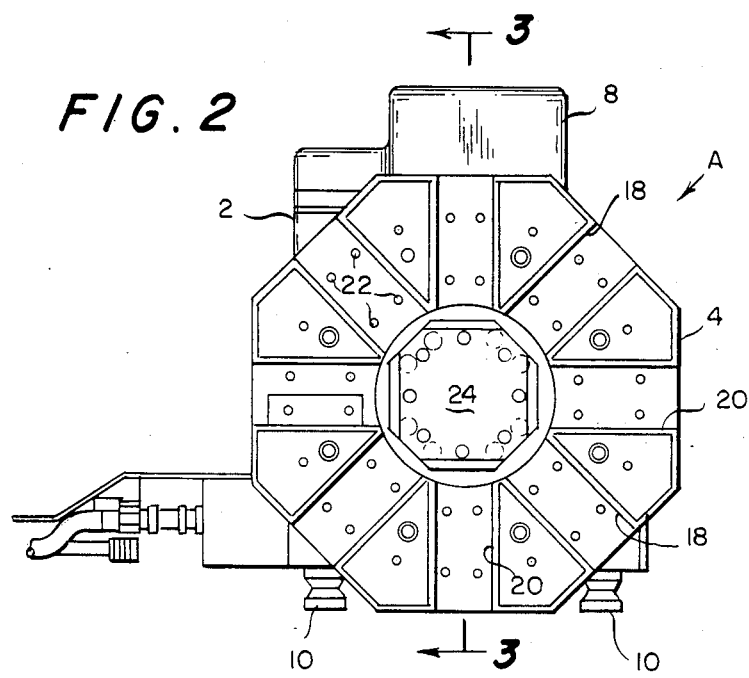
FIG. 2 is an end elevational view of the turret assembly of FIG. 1.

FIGS. 1 and 2

Referring now to FIGS. 1 and 2, turret assembly A includes stationary turret housing 2, indexable turret top plate 4 mounted on the forward end of turret housing 2, and motor drive unit 6 attached to the rear end portion of housing 2. Encoder cover member 8 is secured to the top of housing 2 while turret assembly mounting studs 10 are attached to the base of housing 2. Electrical connectors 12, hydraulic couplings 14 and pneumatic coupling 16 extend into housing 2 for connection with respective internal components to be later described in detail.

Turret top plate 4 includes a plurality of radially extending tool receiving apertures 18 and 20. Apertures 18 are arranged for receiving stationary tooling while apertures 20 are arranged for receiving live tooling. Each of the apertures 18 and 20 are provided with a series of mounting holes 22 for receiving corresponding screws or bolts for securing the tooling in place. A cover assembly 24 is centrally mounted upon turret top plate 4 for housing a live tooling bevel gear. A plurality of removable plug assemblies 26 are mounted in corresponding apertures formed in cover assembly 24 allowing access to the bevel gear (not shown in FIGS. 1 and 2).

Motor drive unit 6 includes an electrical couplings 28 and 30.

FIG. 3

Figure 3:
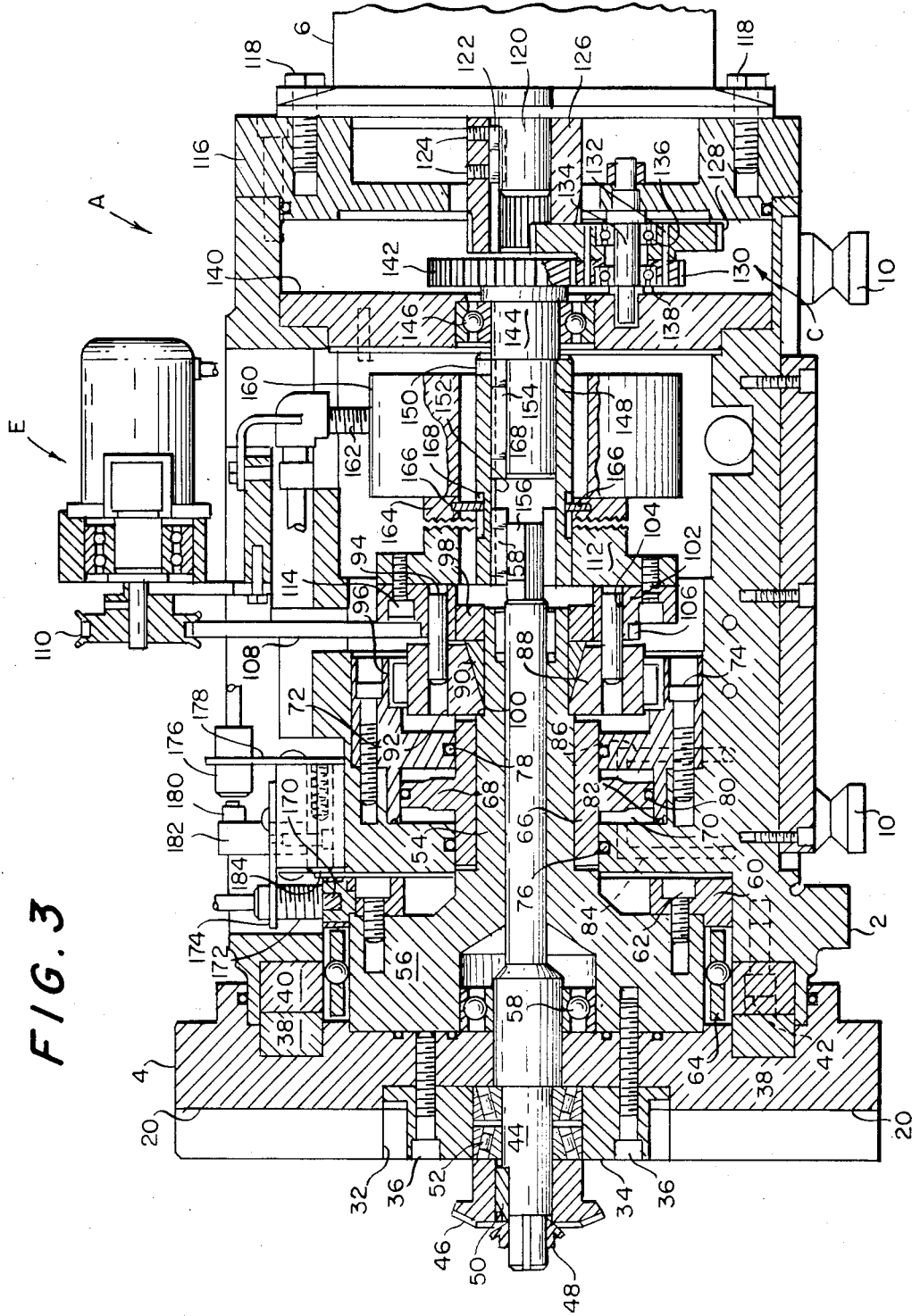
FIG. 3 is a cross-sectional view of the turret assembly taken on lines 3—3 of FIG. 2 and viewed in the direction of the arrows.

FIG. 3 shows turret assembly A with encoder cover member 8 and bevel gear cover assembly 24 of FIGS. 1 and 2 removed for the sake of clarity. Turret top plate 4 is mounted for rotational and axial displacement at the forward end of housing 2. Turret top plate 4 includes a central opening 32 formed therein with a plurality of live tool receiving apertures 20 and stationary tool receiving apertures 18 (not shown) extending radially of central opening 32. Mounted within central opening 32 is an annular tool stop 34 which is secured to top plate 4 by means of bolts 36. An annular face gear 38 is mounted in the base of top plate 4 while a correspondingly spaced face gear 40 is mounted by means of bolts 42 upon stationary housing 2. Engagement of face gear 38 with face gear 40 allows accurate and positive positioning of top plate 4 on housing 2.

A drive shaft 44 extends into housing 2 and passes through top plate 4 and tool stop 34. A live tool engaging bevel gear 46 is mounted on the distal end of drive shaft 44 and is secured in place by lock nut 48. Bevel gear 46 is allowed to rotate with drive shaft 44 by means of key interlock 50. Bearing assembly 52 is mounted between tool stop 34 and drive shaft 44.

Mounted for axial and rotational displacement within stationary housing 2 is a hollow index shaft 54. Hollow shaft 54 includes annular shoulder portion 56 which is secured to top plate 4 by means of bolts 36. Drive shaft 44 passes longitudinally through hollow index shaft 54 and is mounted for rotational movement therein by means of bearing assembly 58. Annular switch plate 60 is secured to the base of shoulder portion 56 by means of bolts 62. Switch plate 60 will be described in greater detail later in the specification. Bearing assembly 64 is mounted between the base of top plate 4 and annular switch plate 60 for allowing axial and rotational displacement of hollow index shaft 54 with respect to stationary housing 2. Bearing assembly 64 is free to move axially with switch plate 60, hollow index shaft 54 and top plate 4 upon axial displacement of hollow index shaft 54.

Surrounding hollow index shaft 54 is an annular piston assembly 66 including radially extending piston collar 68. Piston collar 68 is positioned for axial movement within cylinder chamber 70. Cylinder chamber 70 is bounded by housing 2 and by cylinder liner 72 which is secured to housing 2 by means of bolts 74. Cylinder chamber 70 is maintained in a fluid-tight condition by means of annular sealing rings 76, 78, 80 and 82. Hydraulic lines 84 and 86 extend through housing 2 into cylinder chamber 70 for supplying hydraulic fluid to either side of piston collar 68 so as to cause axial displacement of piston assembly 66.

Adjacent to piston assembly 66 and surrounding hollow index shaft 54 is a coupling member 88 and a tapered bushing 90. Coupling member 88 includes a plurality of holes 92 for receiving corresponding pins 94. An anti-friction bearing assembly 96 surrounds coupling member 88. A hex nut 98 is fastened onto the end of hollow shaft 54 and is tightened so as to bear against tapered bushing 90 which in turn forces coupling member 88 into engagement with shoulder 100 of hollow index shaft 54.

A second coupling member 102 is mounted adjacent to coupling member 88 and includes a plurality of holes 104 for receiving the opposite ends of pins 94. An annular timing gear 106 is mounted upon coupling member 102. Timing belt 108 is positioned for engagement around timing gear 106 and likewise is positioned around geared pulley 110 of encoder E which is mounted at the top of housing 2. Annular toothed clutch plate 112 is fastened to the base of coupling member 102 by means of bolts 114.

Through the various connections thus described, it may be seen that activation of piston assembly 66 by the introduction of hydraulic fluid through line 86 causes axial displacement (movement to the left in FIG. 3) of piston assembly 66 which in turn causes a corresponding axial displacement of turret top plate 4 and drive shaft 44. This axial displacement additionally causes face gear 38 to disengage from face gear 40 allowing subsequent rotational displacement or indexing of turret top plate 4. Furthermore, since hex nut 98 is threaded to hollow sleeve 54, axial displacement of piston assembly 66 likewise causes axial displacement of hex nut 98 and with it tapered bushing 90 and coupling member 88. Coupling member 88 shifts axially upon pins 94 which are wedged within holes 104 of coupling member 102. Coupling member 102 and annular toothed clutch plate 112 are restrained from axial displacement.

Rotational displacement of turret top plate 4 and drive shaft 44 is achieved through a unique drive train beginning with a motor drive unit 6 attached to housing rear plate 116 by means of bolts 118. Drive unit 6 is preferably a variable speed, reversible brushless d.c. motor capable of producing 1½ HP. Motor 6 includes a drive shaft 120 which is connected by means of key 122 and set screws 124 to drive pinion 126. Drive pinion 126 cooperates with a cluster gear assembly C comprising a pair of reduction gears 128 and 130 which are interconnected by pins 132. Gears 128 and 130 are mounted on an eccentric shaft 134 by bearing assemblies 136 and 138 respectively. Eccentric shaft 134 is suitably mounted between housing rear plate 116 and clutch gear plate 140. The provision of eccentric shaft 134 reduces backlash in gears 128 and 130.

Gear 128 meshes with drive pinion 126 while gear 130 meshes with clutch drive gear 142. Clutch drive gear 142 is attached to one and end of drive spindle 144 which is mounted by means of bearing assembly 146 within clutch gear plate 140. The end of drive spindle 144 opposite from clutch drive gear 142 extends into drive sleeve 148 and is secured thereto by means of set screws 150 (one shown). Drive sleeve 148 is provided with an internally formed keyway 152 while drive spindle 144 is provided with a key 154 which engages keyway 152.

In addition to drive spindle 144, end portion 156 of drive shaft 44 likewise extends into drive sleeve 148. End portion 156 is provided with an extension 158 which is positioned within keyway 152.

A stationary annular pneumatic clutch housing 160 is positioned within stationary housing 2 with drive sleeve 148 passing therethrough. Air is supplied to the interior of clutch housing 160 by means of air supply conduit 162. An annular toothed clutch plate 164 is associated with clutch housing 160 and is free to rotate with drive sleeve 148 as well as to move axially with respect to drive sleeve 148 by suitable means, for example, by a series of keys 166 cooperating with keyways 168 formed in drive sleeve 148. Within clutch housing 160 are pneumatically activated means (not shown) for axially displacing clutch plate 164 so as to engage and disengage clutch plate 112.

As was previously mentioned, an annular switch plate 60 is mounted by means of bolts 62 to annular shoulder 56 of hollow index shaft 54. The magnet 170 is mounted on the periphery of switch plate 60. A conventional Hall-Effect switch 172 is mounted adjacent to switch plate 60 by means of bracket 174. Hall-Effect switch 172 is connected with motor drive unit 6 by suitable electrical connections (not shown) and together with switch plate 60 provides a means for controlling motor operation only during reference zero return.

A second Hall-Effect switch 176 is mounted by means of bracket 178 adjacent to magnetic actuator 180. Actuator 180 is mounted upon support 182 which is connected to spring biased base slide member 184. Base slide member 184 abuts against switch plate 60.

It may thus be seen that when piston assembly 66 is actuated, hollow shaft 54 as well as switch plate 60 are axially displaced. Axial displacement of switch plate 60 causes a simultaneous axial displacement of magnetic actuator 180 causing deactivation of switch 176. As was the case with regard to switch 172, switch 176 is likewise connected to motor drive unit 6 for controlling the operation thereof, also to notify controller when turret is in position.

OPERATION

Initially, various combinations of stationary and live tools are positioned in respective apertures 18 and 20 formed in top plate 4. The live tools each include a spiral bevel gear arranged for engagement with spiral bevel gear 46. Assuming turret top plate 4 is in the position shown in FIG. 3 with face gears 38 and 40 in engagement and further assuming that clutch plate 164 is disengaged from clutch plate 112, activation of motor drive unit 6 will cause bevel gear 46 to be driven so as to drive the respective live tools.

Assuming the above conditions are met, the following sequence of operation occurs. Drive shaft 120 drives pinion gear 26 driving cluster gear assembly C which in turn drives clutch drive gear 142 and drive spindle 144. Rotation of drive spindle 44 results in rotation of drive sleeve 148 as well as rotation of clutch plate 164. Since clutch plate 164 is in its disengaged position, rotary motion cannot be transfered to clutch plate 112. Rotation of drive sleeve 148 further results in rotation of drive shaft 44 thus driving bevel gear 46. A live tool positioned at the work station will thus be driven by bevel gear 46 to perform a machining operation such as milling, drilling, tapping, etc.

When another tool is required at the work station, motor drive unit 6 is deactivated prior to indexing of turret head 4. The sequence of operation for indexing turret head 4 takes place as follows. First, hydraulic fluid is passed through hydraulic line 86 into the right hand portion of cylinder chamber 70. Accumulation of fluid within chamber 70 causes axial displacement of annular piston assembly 66 (to the left in FIG. 3) which in turn axially displaces hollow drive shaft 54, turret top plate 4, drive shaft 44 and bevel gear 46. Axial displacement of turret top plate 4 causes face gear 38 to disengage from face gear 40. Even though drive shaft 44 has shifted, a driving connection is still maintained between end portion of 44 and drive sleeve 148 via extension member 158. Simultaneous with the axial displacement of hollow sleeve 56 is the axial displacement of hex nut 98, tapered bushing 90 and coupling member 88. Coupling member 88 slides on pins 94 which are press fitted into holes 106 of coupling member 102. Even after axial displacement of coupling member 88 away from coupling member 102, a driving connection is still maintained via pins 94. Axial displacement of hollow shaft 54 likewise causes axial displacement of switch plate 60 which in turn displaces magnetic actuator 180 from switch 176 thus deactivating switch 176. Once switch 176 is deactivated, the signal is sent to a central controller (not shown) to initiate rotational indexing of turret head 4.

The next stage of the indexing process begins with the delivery of air via air supply conduit 162 into pneumatic clutch housing 160 so as to cause axial displacement of clutch plate 164 into engagement with clutch plate 112. Pneumatic clutch housing 160 is part of a standard assembly produced by Horton Manufacturing Company and distributed under the trade name "Air Champ". It may be seen that when clutch plate 164 is engaged with clutch plate 112 a driving connection is still maintained between drive sleeve 148 and clutch plate 164.

The final stage of indexing begins with the reactivation of motor drive unit 6. Rotational displacement of drive sleeve 148 is transmitted to clutch plate 164 and to clutch plate 112. Rotation of clutch plate 112 causes rotation of coupling member 102, timing gear 106, timing belt 108 and geared pulley 110 of encoder E.

Rotation of coupling member 102 additionally causes rotation via pins 94 of coupling member 88, tapered bushing 90, hex nut 98, hollow shaft 54 and turret top plate 4. In addition, as drive sleeve 148 is rotated, drive shaft 44 including bevel gear 46 are likewise rotated due to the interconnection between extension member 158 and drive sleeve 148.

During the rotational indexing process, encoder E maintains precise tracking of the position of turret head 4 through the timing gear/belt arrangement. Encoder E has 4000 quadrature pulses per revolution and is belted 2 to 1 which produces 8000 output pulses per revolution of turret head 4. This arrangement allows the turret head to be accurately positioned with $\pm\frac{1}{4}$ of a degree. The output from encoder E is sent to the central controller (not shown) for ultimately controlling the operation of motor drive unit 6.

Once motor drive unit 6 has been deactivated and the proper tool is positioned at the work station, the indexing operation concludes with introduction of hydraulic fluid via hydraulic line 84 to axially displace piston assembly 66 (piston assembly 66 is displaced to the right in FIG. 3) whereby turret head 4 once again moves axially toward housing 2 causing engagement of annular face gear 38 with annular face gear 40. Thus, turret head 4 is positively locked against further rotation. Air within pneumatic clutch housing 160 may then be vented to the exterior of housing 2 causing disengagement of clutch plate 164 from clutch plate 112. Axial displacement of turret head 4 (to the right in FIG. 3) causes reactivation of switch 176 signaling that indexing has been completed. Assuming a live tool is now in position at the work station, motor drive unit 6 may once again be activated to turn bevel gear 46 and to subsequently drive the live tooling.

It should be noted that cluster gear assembly C produces a 3 to 1 reduction generating adequate torgue so as to index turret head 4 even when heavy off balance tools are mounted thereon. It should be further noted that encoder E comes into action only when turret head 4 is indexing and that when the turret assembly is started up from a power down condition, turret head 4 will always return to the reference home position (station No. 1). Encoder E and Hall-Effect switch 172 are used for determining the absolute position of turret head 4 during start up. Indexing is bi-directional following the shortest path with a programmable option to override this feature. Furthermore, the live tooling spindle speed is variable and bi-directional under the control of the programmer.

While this invention has been described in connection with a single embodiment thereof, it will be understood that it is capable of further modifications, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and followed in the scope of the invention or the limits of the appended claims.

We claim:

1. A live tooling turret assembly comprising:
   (a) a stationary housing;
   (b) a turret top plate movably mounted on said housing for axial and rotational displacement with respect to said housing;
   (c) said turret top plate including a drive shaft extending into said housing and through said top plate;
   (d) said turret top plate including means for mounting live tooling;
   (e) said drive shaft including means for engaging and driving said live tooling when mounted on said top plate;
   (f) supporting means in said housing supporting said top plate including said drive shaft;
   (g) said supporting means being movably mounted in said housing for axial and rotational displacement simultaneously with said top plate;
   (h) indexing means associated with said housing for moving said top plate and said supporting means axially and rotationally with respect to said housing; and
   (i) drive means associated with said drive shaft for permitting said drive shaft to be driven independently of said indexing means and for permitting said drive shaft to be driven simultaneously with said indexing means when said indexing means is moved axially and rotationally with respect to said housing.

2. A live tooling turret assembly as in claim 1 and wherein:
   (a) said turret top plate including a central opening for receiving said drive shaft, and
   (b) said means for mounting live tooling including a plurality of spaced, tool receiving apertures formed in said top plate and extending radially of said central opening.

3. A live tooling turret assembly as in claim 2 and wherein:
   (a) said drive shaft including a proximal end portion located within said housing and a distal end portion passing through said central opening of said top plate; and
   (b) said means for engaging and driving said live tooling including a spiral bevel gear secured to said distal end portion of said drive shaft.

4. A live tooling turret assembly as in claim 1 and wherein:
   (a) said supporting means includes a hollow index shaft having a first end portion secured to said top plate and a second end portion cooperating with said indexing means; and
   (b) said drive shaft being coaxial with and extending longitudinally through said hollow index shaft.

5. A live tooling turret assembly as in claim 1 and wherein:
   (a) said indexing means including a cylinder chamber formed within said housing and a fluid activated piston arranged for axial movement within said cylinder chamber and engageable with said supporting means for axially moving said top plate and said supporting means; and
   (b) said indexing means including drive coupling means interconnecting said drive means and said supporting means for transferring rotational movement to said top plate and said supporting means.

6. A live tooling turret assembly as in claim 5 and wherein:
   (a) said indexing means further including encoder means for tracking rotational movement of said turret head during indexing thereof.

7. A live tooling turret assembly as in claim 1 and wherein said drive means comprising:
   (a) a motor;
   (b) a sleeve rotatably driven by said motor and connected to said drive shaft for rotating said drive shaft;
   (c) a first clutch plate interconnected with said supporting means for rotation therewith;
   (d) a second clutch plate rotatably driven by said sleeve and axially displaceable for engaging and disengaging said first clutch plate;
   (e) activation means for axially displacing said second clutch plate;
   (f) said activation means being activated subsequent to axial displacement of said top plate away from said housing by said indexing means to cause engagement of said second clutch plate with said first clutch plate thereby allowing rotational indexing of said top plate and said supporting means; and
   (g) said drive shaft capable of being driven independently of said indexing means subsequent to axial displacement of said top plate towards said housing by said indexing means and upon disengagement of said clutch plates by said activation means.

8. A live tooling turret assembly as in claim 7 and wherein;
   (a) said motor being a variable speed, reversible d.c. motor.

9. A live tooling turret assembly as in claim 7 and wherein:
   (a) said drive means including reduction gearing interconnecting said motor and said sleeve.

10. A live tooling turret assembly as in claim 9 and wherein:
    (a) said reduction gearing comprising a cluster gear assembly; and
    (b) said cluster gear assembly being mounted on an eccentric shaft for eliminated backlash of said cluster gears.

11. A live tooling turret assembly as in claim 7 and wherein:
    (a) said activation means being pneumatically operated.

12. A live tooling turret assembly as in claim 1 and wherein:
    (a) said turret top plate including a first annular face gear attached thereto;
    (b) said stationary housing including a second annular face gear attached thereto; and
    (c) said first face gear being engageable with said second face gear upon axial displacement of said top plate towards said housing by said indexing means for accurately and positively seating said top plate on said housing.

13. A live tooling turret assembly for machine tools comprising:
    (a) a turret mounted on said assembly;
    (b) means for indexing said turret;
    (c) means on said turret for mounting a plurality of live tooling;
    (d) means for driving said live tooling;
    (e) means for permitting turret indexing; and,
    (f) timing and encoder means connected to said means for driving said live tooling for controlling operation of said driving means.

14. A live tooling turret assembly as in claim 13 and wherein:
(a) said timing and encoder means includes a timing belt driven by said driving means.

15. A live tooling turret assembly as in claim 14 and including:
(a) a drive motor on said assembly; and
(b) said timing belt is positioned intermediate said assembly.

16. A live tooling turret assembly as in claim 15 and wherein:
(a) said turret is positioned at one end of said assembly; and
(b) said drive motor is positioned at the other end of said assembly.

17. A live turret assembly as in claim 15 and including:
(a) hydraulic and pneumatic turret operator means.

18. A live turret assembly as in claim 17 and wherein:
(a) said hydraulic turret operator means includes means for axially raising and lowering said turret.

19. A live turret assembly as in claim 17 and wherein:
(a) said pneumatic turret operator means includes means permitting said means for driving said live tooling to be connected to said turret indexing means.

20. A live turret assembly as in claim 19 and wherein:
(a) said pneumatic turret operator means includes a toothed clutch mechanism.

21. A live turret assembly as in claim 13 and wherein:
(a) said means for indexing said turret includes an annular switch plate rotatably displaceable with said turret; and
(b) a stationary switch mounted on said assembly and activated by said switch plate.

22. A live turret assembly as in claim 21 and wherein:
(a) said annular switch plate includes a magnet radially mounted therein; and
(b) said switch being activated by said magnet.

23. A live turret assembly as in claim 13 and wherein:
(a) said means for indexing said turret includes a magnetic actuator axially displaceable with said turret;
(b) a stationary switch mounted on said assembly adjacent to said magnetic actuator; and
(c) said switch being activated upon axial displacement of said magnetic actuator.

* * * * *